United States Patent [19]

Hollmann

[11] Patent Number: 5,214,366
[45] Date of Patent: May 25, 1993

[54] THREE-PHASE CONVERTER FOR POLYPHASE INDUCTION MOTORS

[75] Inventor: Rolf Hollmann, Herzogenaurach, Fed. Rep. of Germany

[73] Assignee: Siemens Aktiengesellschaft, Munich, Fed. Rep. of Germany

[21] Appl. No.: 900,552

[22] Filed: Jun. 18, 1992

Related U.S. Application Data

[63] Continuation of Ser. No. 614,075, Nov. 13, 1990, abandoned.

[30] Foreign Application Priority Data

Nov. 13, 1989 [DE] Fed. Rep. of Germany ....... 3937739

[51] Int. Cl.[5] ............................................. H02P 9/42
[52] U.S. Cl. .................................... 318/801; 318/809; 318/803; 363/134; 363/160; 363/10; 363/71
[58] Field of Search ............... 318/793, 803, 801, 808, 318/809, 805, 799, 718; 363/89, 70, 65, 10, 37, 71, 68, 35, 134, 127, 144, 138, 123, 159, 160, 161, 67

[56] References Cited

U.S. PATENT DOCUMENTS

| | | | |
|---|---|---|---|
| 3,470,448 | 9/1969 | Krabbe | 318/808 |
| 3,588,668 | 6/1971 | Cova | 363/162 |
| 3,711,760 | 1/1973 | Kaiser | 326/5 |
| 3,758,869 | 9/1973 | Wagner | 363/234 |
| 3,792,286 | 12/1974 | Meier | 307/58 |
| 3,902,112 | 8/1975 | Cordier | 318/718 |
| 4,317,166 | 2/1982 | Winkler et al. | 363/71 |
| 4,392,099 | 7/1983 | Kuniyoshi | 318/803 |
| 4,670,826 | 6/1987 | Tanaka | 363/10 |
| 4,739,466 | 4/1988 | Glennon et al. | 363/89 |
| 4,816,980 | 3/1989 | Wiendl | 363/68 |
| 4,853,664 | 8/1989 | Asukura | 363/160 |

OTHER PUBLICATIONS

Book by B. R. Pelly: "*Thyristor Phase-Controlled Converters and Cycloconverters*", Wiley Interscience, a Division of John Wiley & Sons, Inc., New York, London, Sydney, Toronto, pp. 207–215.

*Primary Examiner*—William M. Shoop, Jr.
*Assistant Examiner*—John W. Cabeca
*Attorney, Agent, or Firm*—Kenyon & Kenyon

[57] ABSTRACT

A three-phase converter for polyphase induction motors has an input transformer with primary windings and at least two secondary windings associated with each primary winding, and controlled power semiconductors. Groups of power semiconductors are connected to the secondary windings such that the power semiconductors operate in series with the motor phases.

25 Claims, 5 Drawing Sheets

THREE-PHASE CONVERTER FOR POLYPHASE INDUCTION MOTORS

This application is a continuation of application Ser. No. 07/614,075, filed on Nov. 13, 1990, now abandoned.

BACKGROUND OF THE INVENTION

The invention relates generally to three-phase converters for polyphase induction motors, and in particular to such an converter with an input transformer that has at least two secondary windings associated with each primary winding, and has controlled power semiconductors.

Various versions of three-phase converters with an input transformer and controlled power semiconductors are known. B.R. Pelly, *Thyristor Phase-Controlled Converters and Cycloconverters*, WILEY-INTERSCIENCE, a division of John Wiley & Sons, Inc., NY, London, Sydney, and Toronto analyzes these converter determining their advantages and drawbacks. This book describes the Symmetrical Six-Pulse Midpoint Circuit on page 210 and illustrated it in detail on page 211. This converter is complex, large and relatively inefficient.

The present invention is directed to solving the problem of developing a (2×3)-pulse converter, that is simpler, smaller, and more efficient than the prior art.

SUMMARY OF THE INVENTION

The present invention solves this problem by providing an input transformer with a primary winding and at least two secondary windings associated with the primary winding, and groups of power semiconductors connected to the secondary windings such that the power semiconductors operate in series with the motor phases.

The essence of this circuitry is that the motor phases are in series with the power semiconductors. Surprisingly, this substantially simplifies and improves the subassembly, which is a single unit consisting of transformers, semiconductors and motor windings. Since the circuit is open relative to the motor phases, a transition from the known parallel circuitry to a series circuit cannot be avoided. The motor-phase star point is a virtual connection, and interconnects only through the power semiconductors, which are activated appropriately in the secondary coil of the input transformer. The secondary coil must be a unit. The surprising result of a series as opposed to a parallel circuit is that advantages are considerable with respect to optimization. Another advantage is that there is twice as much voltage in the converter in a series circuit than there is with a parallel circuit. Still, even though the motor's operating voltage is twice as high, the same cost-effective pulse transmitters, thyristors, etc. used in the known circuitry can be employed. A final advantage is that the balance coils required in the known approaches are no longer necessary.

The power semiconductors in the individual groups in one embodiment of the invention have controls that activate cooperative semiconductors in an overlapping sequence. The particular advantage of this approach is the possibility of reversing the current without dead time and that the blocking voltage need not be determined for every phase. The system is also not necessarily subject to direct current, which is another cost-effective simplification that eliminates the need for appropriate barriers.

One advantageous approach to controlling the semiconductors is to achieve the overlap by activating the particular power semiconductor before the current travels through its theoretical zero point and then maintaining the semiconductor ready to engage.

Although the present invention involving a converter circuit is not the tried and true system of star-point phase shifting within a three-phase motor, it has been demonstrated that the lack of a star point is no drawback when appropriate controls are employed.

DETAILED DESCRIPTION

Figure 1:
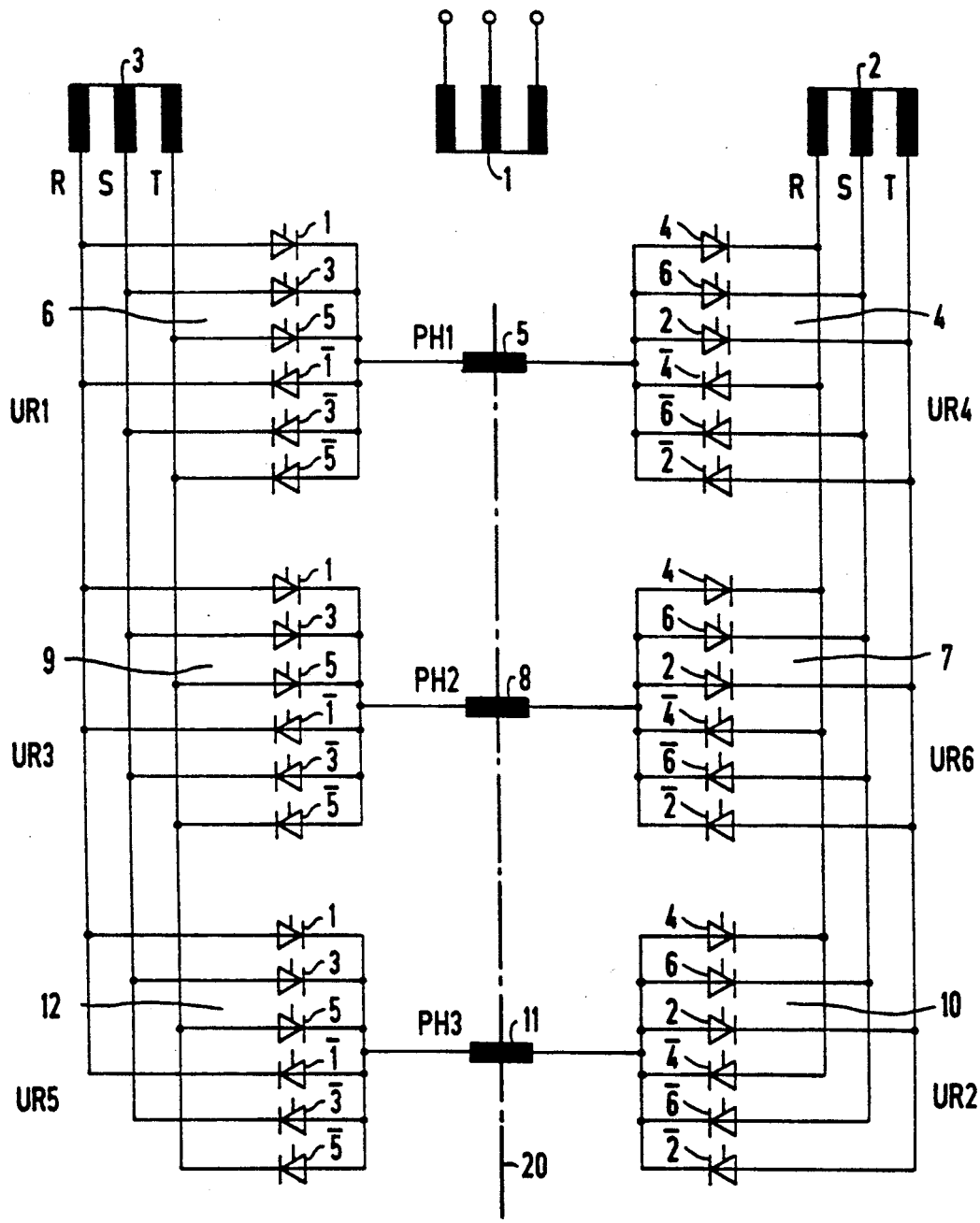
FIG. 1 illustrates a simple converter according to the present invention.

The input transformer illustrated in FIG. 1 has a primary winding 1 and two secondary windings 2 and 3 associated with the primary winding. The secondary windings are preferably nested into a coil, rendering the input component very compact.

Groups of power semiconductors 4, 6, 7, 9, 10, and 12, which constitute the converter's thyristors, are individually connected to each phase of the secondary windings 2 and 3. Each of the groups is arranged in a known star-connected circuit. According to the invention, the star points of power semiconductor groups 4, 6, 7, 9, 10 and 12 are serially connected to motor phase windings 5, 8, and 11. This connection forms three series circuits, e.g. from the secondary winding 3 through the group of power semiconductors 6 through the motor phase windings 5 through the group of power semiconductors 4 and to the secondary winding 2. The motor (not shown) is symbolically represented by the dot-and-dash line 20 that interconnects phase windings 5, 8, and 11.

Figure 2:
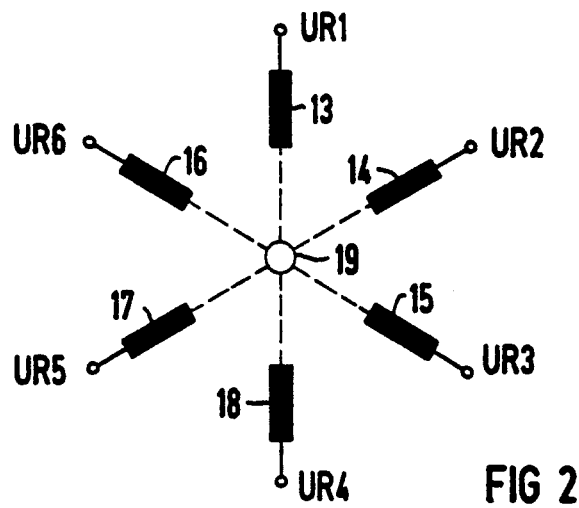
FIG. 2 represents the layout of phases in the motor.

FIG. 2 represents the phase relation inside the motor. The figure depicts the individual motor windings 13 through 18 and the strictly virtual star point 19. Obviously, the configuration is perfectly symmetrical and open.

Figure 3:
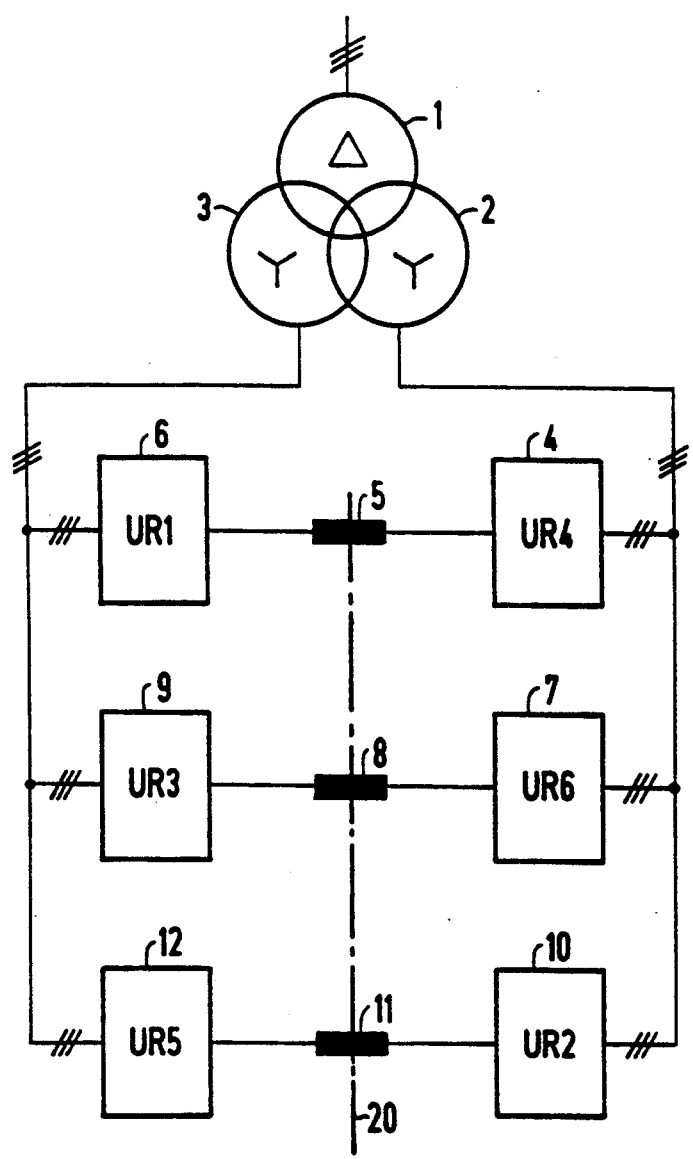
FIG. 3 is a schematic drawing of a (2×3)-pulse circuit.

FIG. 3 is a simplified illustration of the circuitry illustrated in FIG. 1. Identical components are labeled with the same reference numbers. The same symbols are employed for the block diagrams in FIGS. 4 and 5.

Figure 4:
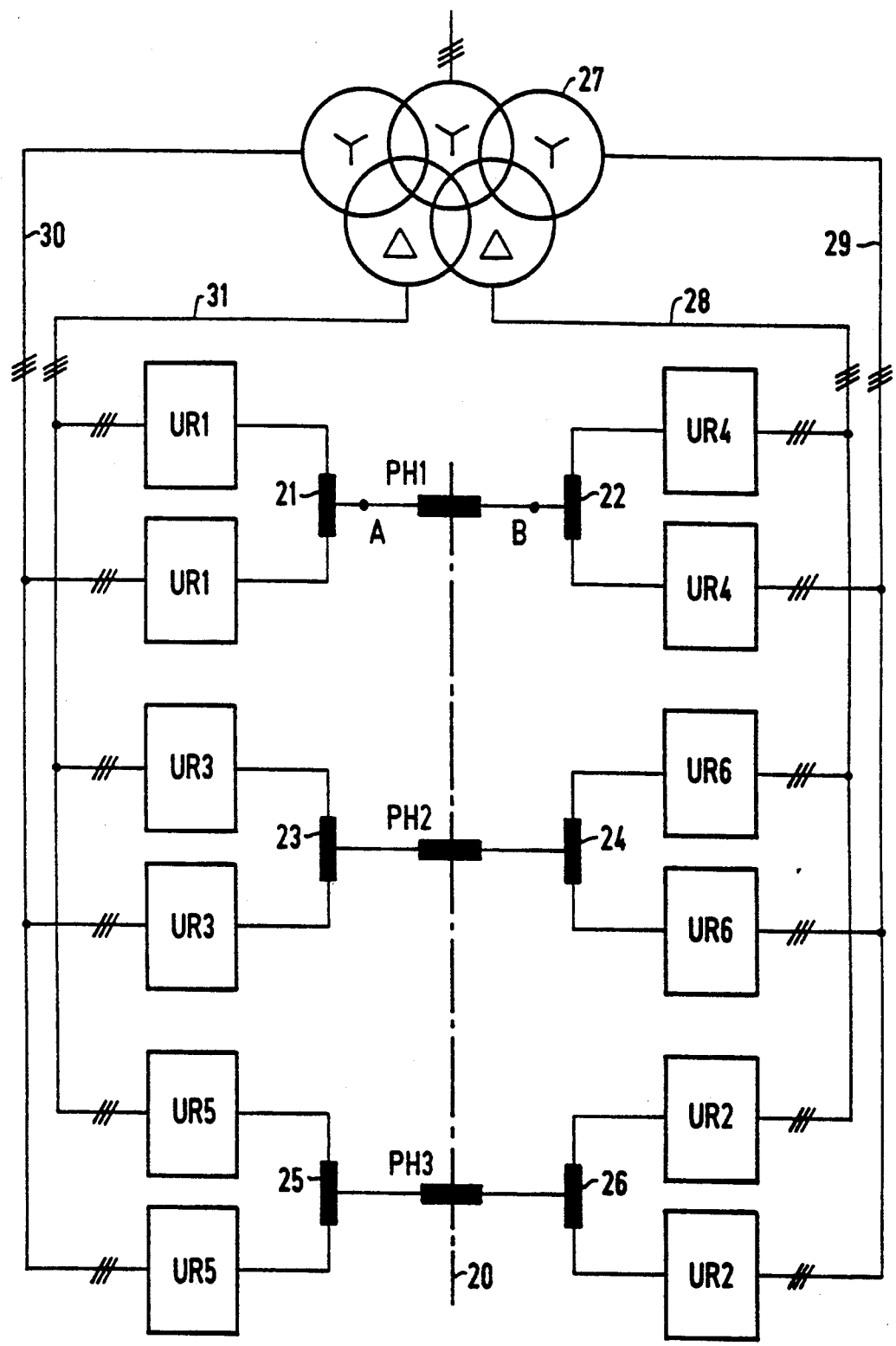
FIG. 4 illustrates a (4×3)-pulse version of a converter.

The input transformer 27 in FIG. 4 is preferably a 2-level transformer. FIG. 4 also illustrates an open (4×3)-pulse circuit. The two halves of the circuit are connected to the transformer by channels 28 and 29 or 30 and 31, which meet at balance coils 21 through 26. Each three-phase bridge is accordingly divided into two parts. Each is connected to a different transformer coil, although at the same phase. The power-semiconductor groups in each motor phase are activated with overlapping ignition pulses, as in the (2×3)-pulse circuit illustrated in FIG. 1. The individual groups are paired by way of balance coils 21 through 26. The transformer in the embodiment illustrated in FIG. 4 can be miniaturized, which is particularly advantageous when there is not much room to accommodate two separate transformer. Additionally, the components can be exposed to less voltage. The resulting overall miniaturization can be a definite advantage in some situations.

Figure 5:
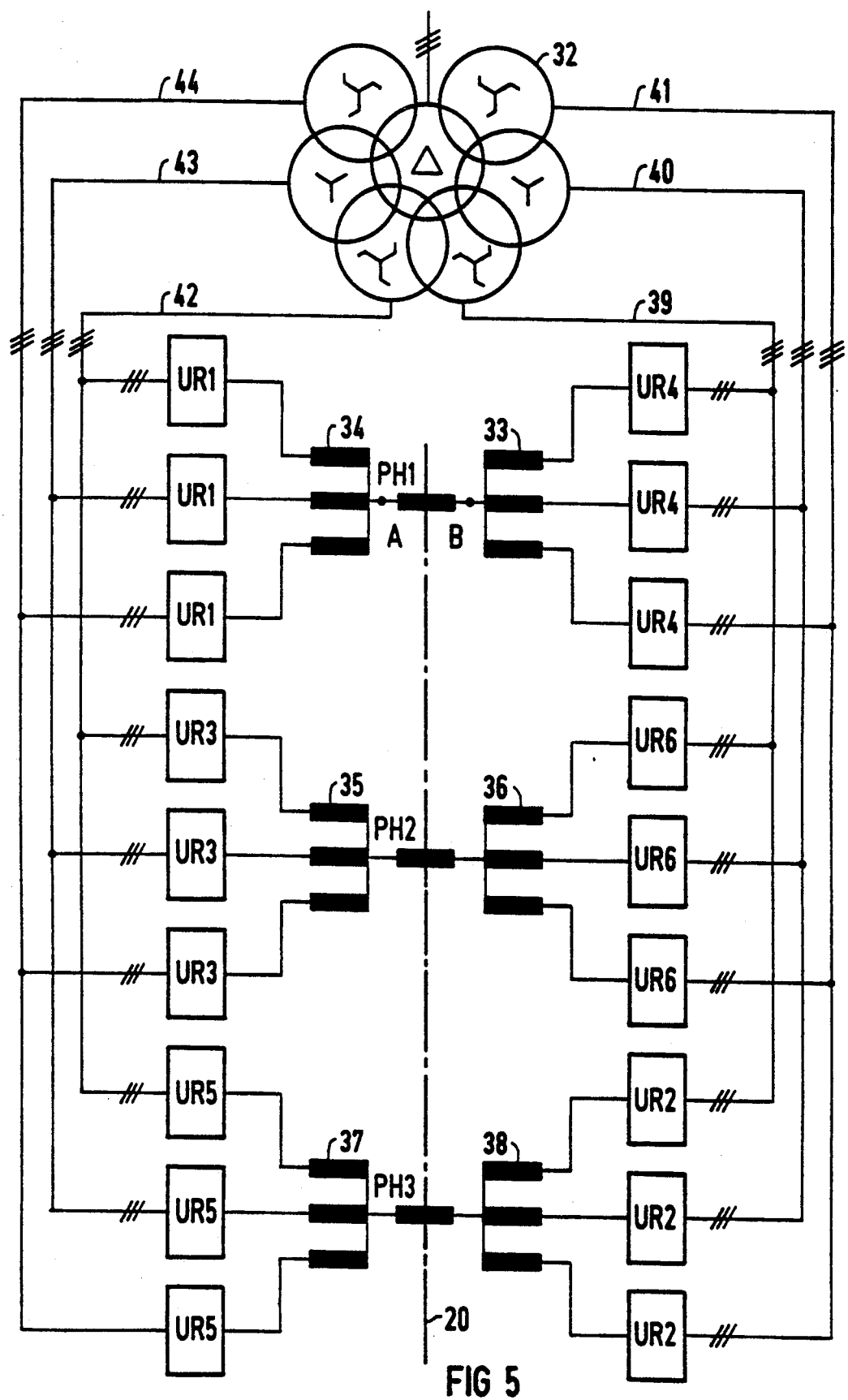
FIG. 5 illustrates a (6×3)-pulse version of a converter.

The advantages that can be attained with the circuit illustrated in FIG. 5 are similar. The input transformer 32 in this embodiment is preferably a three-level component. Channels 39 to 44 connect the power semiconductor groups to the transformer's secondary windings. The star points of balance coils 33 through 38, which branch into three paths as illustrated in FIG. 7, are also connected to the motor phases, with each pair of phases constituting a series circuit.

Figure 6:
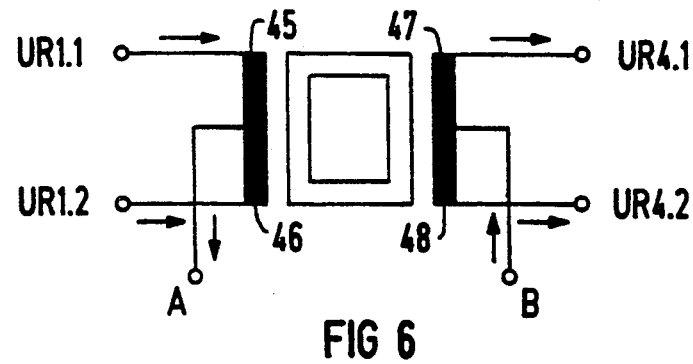
FIG. 6 represents a balance coil for a (4×3)-pulse pulse version.
Figure 7:
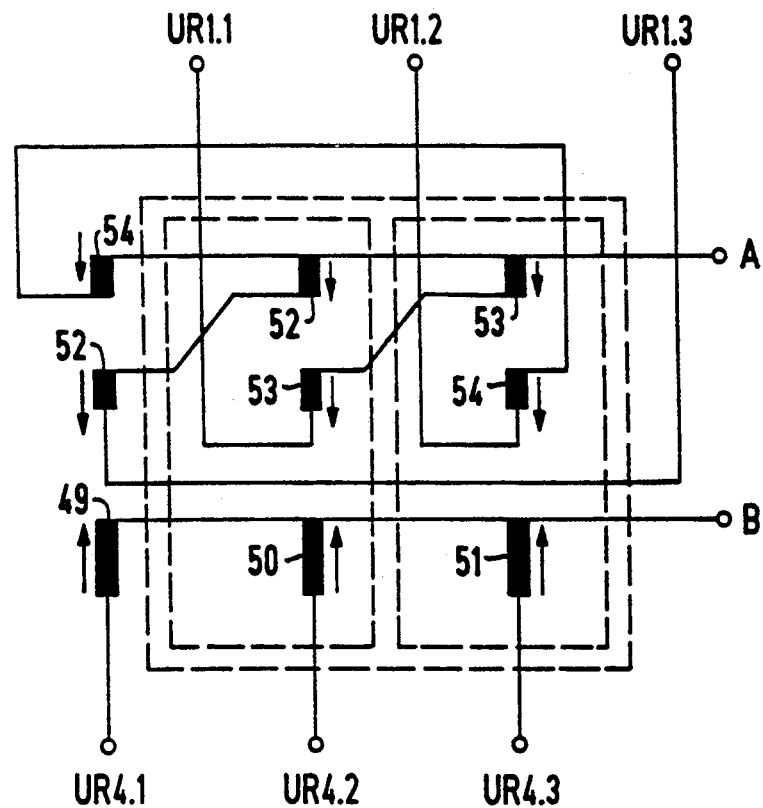
FIG. 7 illustrates a balance coil for a (6×3)-pulse circuit with three branches.

The balance coils illustrated in FIGS. 4 and 5 are illustrated in detail in FIGS. 6 and 7. The current fluxes from coils 45 and 46 and 47 and 48 in FIG. 6 and from coils 49, 50, and 51 and 52, 53, and 54 in FIG. 7 will be symmetrical. The motor phases PH at the output end are in series with the balance coils.

The circuits with more numerous (4×3, 6×3, etc.) pulses can be obtained without much additional expense with controls constructed from standard components. They will allow operation with output frequencies that are substantially higher than those that have been previously attained. The lack of dead time when the currents are reversed is a particular advantage. Surprisingly, the extra expense for such circuits is not high because the transformers are relatively small, considering their capabilities. A particular advantage in all these circuits is that no fuses are necessary and the semiconductors do not need to be unnecessarily large, when they contain appropriate rapid-action switches.

What is claimed is:

1. A three-phase converter for an induction motor having a first, second and third phase, comprising:
   a) an input transformer having a primary winding and a first and second secondary winding associated with said primary winding, wherein said first and second secondary windings have a plurality of phases;
   b) a first bidirectional group of power semiconductors being coupled to the plurality of phases of said first secondary winding;
   c) a second bidirectional group of power semiconductors being coupled to the plurality of phases of said second secondary winding;
   d) a third bidirectional group of power semiconductors being coupled to the plurality of phases of said first secondary winding;
   e) a fourth bidirectional group of power semiconductors being coupled to the plurality of phase of said second secondary winding;
   f) a fifth bidirectional group of power semiconductors being coupled to the plurality of phases of said first secondary winding; and
   g) a sixth bidirectional group of power semiconductors being coupled to the plurality of phases of said second secondary winding, wherein the first phase of the induction motor is coupled in series between said first and fourth bidirectional groups of power semiconductors, the second phase of the induction motor is coupled in series between said third and sixth bidirectional groups of power semiconductors and the third phase of the induction motor is coupled in series between said fifth and second bidirectional groups of power semiconductors, whereby the first, second and third phases of the induction motor are not connected to each other but rather form a virtual star point.

2. The three-phase conveter according to claim 1, further comprising a controller controlling the first through sixth bidirectional groups of power semiconductors, whereby said controller activates the power semiconductors in sequence with overlapping ignition pulses.

3. The three-phase converter according to claim 2, wherein the overlapping ignition pulses are achieved by maintaining the power semiconductors ready to engage and activating them before a calculated current zero crossing.

4. The three-phase converter according to claim 1, wherein the first and second secondary windings are nested into a single coil.

5. The three-phase converter according to claim 2, wherein the first and second secondary windings are nested into a single coil.

6. The three-phase converter according to claim 3, wherein the first and second windings are nested into a single coil.

7. The three-phase converter according to claim 1, further comprising:
   h) a first balance coil being coupled to said first bidirectional group of power semiconductors;
   i) a second balance coil being coupled to said second bidirectional group of a power semiconductors;
   j) a third balance coil being coupled to said third bidirectional group of power semiconductors;
   k) a fourth balance coil being coupled to said fourth bidirectional group of power semiconductors, wherein the first motor phase is coupled in series between the first and fourth balance coils;
   l) a fifth balance coil being coupled to said fifth bidirectional group of power semiconductors, wherein the second motor phase is coupled in series between the second and fifth balance coils; and
   m) a sixth balance coil being coupled to said sixth bidirectional group of power semiconductors, wherein the third motor phase is coupled in series between the third and sixth balance coils.

8. The three-phase converter according to claim 2, further comprising:
   h) a first balance coil being coupled to said first bidirectional group of power semiconductors;
   i) a second balance coil being coupled to said second bidirectional group of power semiconductors;
   j) a third balance coil being coupled to said third bidirectional group of power semiconductors;
   k) a fourth balance coil being coupled to said fourth bidirectional group of power semiconductors, wherein the first motor phase is coupled in series between the first and fourth balance coils;
   l) a fifth balance coil being coupled to said fifth bidirectional group of power semiconductors, wherein the second motor phase is coupled in series between the second and fifth balance coils; and
   m) a sixth balance coil being coupled to said sixth bidirectional group of power semiconductors, wherein the third motor phase is coupled in series between the third and sixth balance coils.

9. The three-phase converter according to claim 3, further comprising:
   h) a first balance coil being coupled to said first bidirectional group of power semiconductors;

i) a second balance coil being coupled to said second bidirectional group of power semiconductors;

j) a third balance coil being coupled to said third bidirectional group of power semiconductors;

k) a fourth balance coil being coupled to said fourth bidirectional group of power semiconductors, wherein the first motor phase is coupled in series between the first and fourth balance coils;

l) a fifth balance coil being coupled to said fifth bidirectional group of power semiconductors, wherein the second motor phase is coupled in series between the second and fifth balance coils; and m) a sixth balance coil being coupled to said sixth bidirectional group of power semiconductors, wherein the third motor phase is coupled in series between the third and sixth balance coils.

10. The three-phase converter according to claim 4, further comprising:

h) a first balance coil being coupled to said firs bidirectional group of power semiconductors;

i) a second balance coil being coupled to said second bidirectional group of power semiconductors;

j) a third balance coil being coupled to said third bidirectional group of power semiconductors;

k) a fourth balance coil being coupled to said fourth bidirectional group of power semiconductors, wherein the first motor phase is coupled in series between the first and fourth balance coils;

l) a fifth balance coil being coupled to said fifth bidirectional group of power semiconductors, wherein the second motor phase is coupled in series between the second and fifth balance coils; and m) a sixth balance coil being coupled to said sixth bidirectional group of power semiconductors, wherein the third motor phase is coupled in series between the third and sixth balance coils.

11. The three-phase converter according to claim 7, wherein the first through sixth balance coils have two branches.

12. The three-phase converter according to claim 8, wherein the first through sixth balance coils have three branches.

13. The three-phase converter according to claim 8, wherein the first through sixth balance coils have three branches.

14. A three-phase conveter for an induction motor having a first, second and third phase, comprising:

a) an input transformer having a primary winding and a first, second, third and fourth secondary winding associated with said primary winding, wherein said first, second, third and fourth secondary windings each have a plurality of phases;

b) a first, second and third bidirectional group of power semiconductors being coupled to the plurality of phases of said first secondary winding;

c) a fourth, fifth and sixth bidirectional group of power semiconductors being coupled to the plurality of phases of said second secondary winding;

d) a seventh, eight and ninth bidirectional group of power semiconductors being coupled to the plurality of phases of said third secondary winding;

e) a tenth, eleventh and twelfth bidirectional group of power semiconductors being coupled to the plurality of phases of said fourth secondary winding;

f) a first balance coupled being coupled in series between said first and fourth bidirectional groups of power semiconductors and having a center tap;

g) a second balance coil being coupled in series between said second and fifth bidirectional group of power semiconductors and having a center tap;

h) a third balance coil being coupled in series between said third and sixth bidirectional groups of power semiconductors and having a center tap;

i) a fourth balance coil being coupled in series between said seventh and tenth bidirectional group of power semiconductors and having a center tap, wherein the first phase of the induction motor is coupled in series between the center taps of said first and fourth balance coils;

j) a fifth balance coil being coupled in series between said eights and eleventh bidirectional groups of power semiconductors and having a center tap, wherein the second phase of the induction motor is coupled in series between the center taps of said second and fifth balance coils; and k) a sixth balance coil being coupled in series between said ninth and twelfth bidirectional groups of power semiconductors and having a center tap, wherein the third phase of the induction motor is coupled in series between the center taps of said third and sixth balance coils; whereby the first, second and third phases of the induction motor are not connected but rather form a virtual star point.

15. The three-phase converter according to claim 14, further comprising a controller controlling the first through twelfth bidirectional groups of power semiconductors, whereby said controller activates the power semiconductors in sequence with overlapping ignition pulses.

16. The three-phase converter according to claim 15, wherein the overlapping ignition pulses are achieved by maintaining the power semiconductors ready to engage and activating them before a calculated current zero crossing.

17. The three-phase converter according to claim 14, wherein the first 'through fourth secondary windings are nested into a single coil.

18. The three-phase converter according to claim 15, wherein the first through fourth secondary windings are nested into a single coil.

19. The three-phase conveter according to claim 16, wherein the first through fourth secondary windings are nested into a single coil.

20. A three-phase converter for an induction motor having a first, second and third phase, comprising:

a) an input transformer having a primary windings and a first, second, third, fourth, fifth and sixth secondary winding associated with said said primary winding, wherein said first through sixth secondary windings each have a plurality of phases;

b) a first, second and third bidirectional group of power semiconductors being coupled to the plurality of phases of said first secondary winding;

c) a fourth, fifth and sixth bidirectional group of power semiconductors being coupled to the plurality of phase of said second secondary winding;

d) a seventh, either and ninth bidirectional group of power semiconductors being coupled to the plurality of phases of said third secondary winding;

e) a tenth, eleventh and twelfth bidirectional group of power semiconductors being coupled to the plurality of phases of said fourth secondary winding;

f) a thirteenth, fourteenth and fifteenth bidirectional group of power semiconductors being coupled to the plurality of of phases of said firth secondary winding;

g) a sixteenth, seventeenth and eighteenth bidirectional group of power semiconductors being coupled to the plurality of phases of said sixth secondary winding;

h) a first balance coil having a center tap, a first branch coupled to said first bidirectional group of power semiconductors, a second branch coupled to said fourth bidirectional group of power semiconductors and a third branch coupled to said seventh bidirectional group of power semiconductors;

i) a second balance coil having a center tap, a first branch coupled to said second bidirectional group of power semiconductors, a second branch coupled to said fifth bidirectional group of power semiconductors and a third branch coupled to said eight bidirectional group of power semiconductors;

j) a third balance coil having a center tap, a first branch coupled to said third bidirectional group of power semiconductors, a second branch coupled to said sixth bidirectional group of power semiconductors and a third branch coupled to said ninth bidirectional group of power semiconductors;

k) a fourth balance coil having a center tap, a first branch coupled to said tenth bidirectional group of power semiconductors, a second branch coupled to said thirteenth bidirectional group of power semiconductors and a third branch coupled to said sixteenth bidirectional group of power semiconductors, wherein the first phase of the induction motor is coupled in series between the center taps of said first and fourth balance coils;

l) a fifth balance coil having a center tap, a firs branch coupled to said eleventh bidirectional group of power semiconductors, a second branch coupled to said fourteenth bidirectional group of power semiconductors and a third branch coupled to said seventeenth bidirectional group of power semiconductors, wherein the second phase of the induction motor is coupled in series between the center tap of said second and fifth balance coils; and m) a sixth balance coil having a center tap, a first branch coupled to said twelfth bidirectional group of power semiconductors, sa second branch coupled to said fifteenth bidirectional group- of power semiconductors and a third branch coupled to said eighteenth bidirectional group of power semiconductors, wherein the third phase of the induction motor is coupled in series between said third and sixth balance coils, and the first, second and third phase of the induction motor are not a connected to each other but rather form a virtual star point.

21. The three-phase converter according to claim 20, further comprising a controller controlling the first through eighteenth bidirectional groups of power semiconductors, whereby said controller activates the power semiconductors in sequence with overlapping ignition pulses.

22. The three-phase converter according to claim 21, wherein the overlapping ignition pulses are achieved by maintaining the power semiconductors ready to engage and activating them before a calculated current zero crossing.

23. The three-phase converter according to claim 20, wherein the first through sixth secondary windings are nested into a single coil.

24. The three-phase converter according to claim 21, wherein the first through sixth secondary windings are nested into a single coil.

25. The three-phase conveter according to claim 22, wherein the first through sixth secondary windings are nested into a single coil.

* * * * *